(12) United States Patent
Takano (10) Patent No.: US 11,766,896 B2
(45) Date of Patent: Sep. 26, 2023

(54) PNEUMATIC TYRE

(71) Applicant: SUMITOMO RUBBER INDUSTRIES, LTD., Hyogo (JP)

(72) Inventor: Hirokazu Takano, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 670 days.

(21) Appl. No.: 16/504,554

(22) Filed: Jul. 8, 2019

(65) Prior Publication Data

US 2020/0039297 A1   Feb. 6, 2020

(30) Foreign Application Priority Data

Aug. 2, 2018   (JP) ................................. 2018-146077

(51) Int. Cl.
| | |
|---|---|
| *B60C 11/01* | (2006.01) |
| *B60C 11/04* | (2006.01) |
| *B60C 11/11* | (2006.01) |
| B60C 11/03 | (2006.01) |
| B60C 11/12 | (2006.01) |

(52) U.S. Cl.
CPC .............. *B60C 11/01* (2013.01); *B60C 11/04* (2013.01); *B60C 11/11* (2013.01); *B60C 2011/013* (2013.01); *B60C 2011/0365* (2013.01); *B60C 2011/0372* (2013.01); *B60C 2011/1213* (2013.01)

(58) Field of Classification Search
CPC . B60C 11/01; B60C 11/11; B60C 2011/0372; B60C 2011/1213; B60C 13/02
See application file for complete search history.

(56) References Cited

U.S. PATENT DOCUMENTS 6,530,405 B1 * 3/2003 Brown .................... B60C 11/11
  152/902
D761,722 S * 7/2016 Takahashi .................... D12/579
(Continued)

FOREIGN PATENT DOCUMENTS

EP   1033265        9/2000
JP   2014-73776 A   4/2014
(Continued)

OTHER PUBLICATIONS

European Search Report, European Patent Office, Application No. 19185726.7, dated Dec. 18, 2019.

*Primary Examiner* — Justin R Fischer
*Assistant Examiner* — Philip N Schwartz
(74) *Attorney, Agent, or Firm* — Greenblum & Bernstein, P.L.C.

(57) ABSTRACT

A pneumatic tyre includes a tread portion including a shoulder land portion having a tread edge. The shoulder land portion is provided with shoulder lateral grooves extending inwardly in a tyre axial direction from the tread edge so as to define shoulder block elements therebetween, and at least one protrusion protruding from an outer surface in the tyre axial direction of the respective shoulder land portion. The protrusion includes first portions provided on the respective shoulder block elements and extending in a tyre radial direction, and a second portion located inwardly in the tyre radial direction of one of the shoulder lateral grooves and extending in a tyre circumferential direction to connect inner portions of at least two first portions.

16 Claims, 5 Drawing Sheets

(56) References Cited

U.S. PATENT DOCUMENTS

| | | | |
|---|---|---|---|
| 2002/0011293 A1* | 1/2002 | Zanzig | ....................... C08L 7/00 |
| | | | 152/209.16 |
| 2008/0210355 A1* | 9/2008 | Harvey | ............... B60C 11/0304 |
| | | | 152/209.8 |
| 2009/0107600 A1 | 4/2009 | Missik-Gaffney | |
| 2009/0159166 A1 | 6/2009 | Sakamoto | |
| 2017/0166013 A1* | 6/2017 | Kuwano | ................. B60C 13/02 |

FOREIGN PATENT DOCUMENTS

| | | |
|---|---|---|
| JP | 6139843 B2 | 5/2017 |
| WO | 9952720 | 10/1999 |

* cited by examiner

PNEUMATIC TYRE

BACKGROUND ART

Field of the Disclosure

The present disclosure relates to pneumatic tyres suitable for driving on snow.

Description of the Related Art

The following patent document 1 has proposed a pneumatic tyre which is provided on an outer surface region from a tread edge to a sidewall portion with a plurality of polygonal shaped blocks divided by grooves.

Patent Document

[Patent document 1] Japanese Patent No. 6139843

SUMMARY OF THE DISCLOSURE

Unfortunately, in the above-mentioned pneumatic tyre, there is still room for improvement in traction on snow when straight traveling.

In view of the above problems, the present disclosure has an object to provide pneumatic tyres capable of improving traction on snow.

According to one aspect of the disclosure, a pneumatic tyre includes a tread portion including a shoulder land portion having a tread edge, the shoulder land portion being provided with shoulder lateral grooves extending inwardly in a tyre axial direction from the tread edge so as to define shoulder block elements therebetween, and at least one protrusion protruding from an outer surface in the tyre axial direction of the respective shoulder land portion, wherein the at least one protrusion including first portions provided on the respective shoulder block elements and extending in a tyre radial direction, and a second portion located inwardly in the tyre radial direction of one of the shoulder lateral grooves and extending in a tyre circumferential direction to connect inner portions of at least two first portions.

In another aspect of the disclosure, the at least one protrusion, in a front view thereof, may have a U-shaped manner that consists of two first portions and a single second portion connecting said two first portions.

In another aspect of the disclosure, the shoulder lateral grooves may include a first shoulder lateral groove inside which the second portion, in the tyre radial direction, is positioned, and a second shoulder lateral groove inside which no second portion, in the tyre radial direction, is positioned.

In another aspect of the disclosure, the first shoulder lateral groove and the second shoulder lateral groove may be arranged alternately in the tyre circumferential direction.

In another aspect of the disclosure, widths in the tyre circumferential direction of the first portions may be smaller than lengths in the tyre circumferential direction of the respective shoulder block elements.

In another aspect of the disclosure, the widths in the tyre circumferential direction of the first portions may be in a range of from 20% to 60% of the lengths in the tyre circumferential direction of the respective shoulder block elements.

In another aspect of the disclosure, a protruding height of the at least one protrusion may be in a range of from 2.5 to 6.0 mm.

In another aspect of the disclosure, in a cross-sectional view in parallel with the tyre circumferential direction, the first portions each may protrude in a tapered manner such that side surfaces thereof are inclined at an angle of equal to or less than 45 degrees with respect to a normal line of the outer surface of the shoulder land portion.

In another aspect of the disclosure, the first portions may include inner edges extending in the tyre radial direction located inwardly in a circumferential direction of the at least one protrusion, and the inner edges have an angle of equal to or less than 10 degrees with respect to the tyre radial direction.

In another aspect of the disclosure, the first portions may include a constant-width first portion extending in the tyre radial direction with a constant circumferential width, and a non-constant-width first portion extending in the tyre radial direction while varying its circumferential width.

In another aspect of the disclosure, the at least two first portions and the second portion may have radially inner edges located innermost in the tyre radial direction thereof and the inner edges extend along the tyre circumferential direction.

In another aspect of the disclosure, the inner edges of the at least two first portions and the second portion may be connected with each other so as to form a single circular arc.

DESCRIPTION OF THE PREFERRED EMBODIMENTS

An embodiment of the present disclosure will be explained below with reference to the accompanying drawings.

Figure 1:
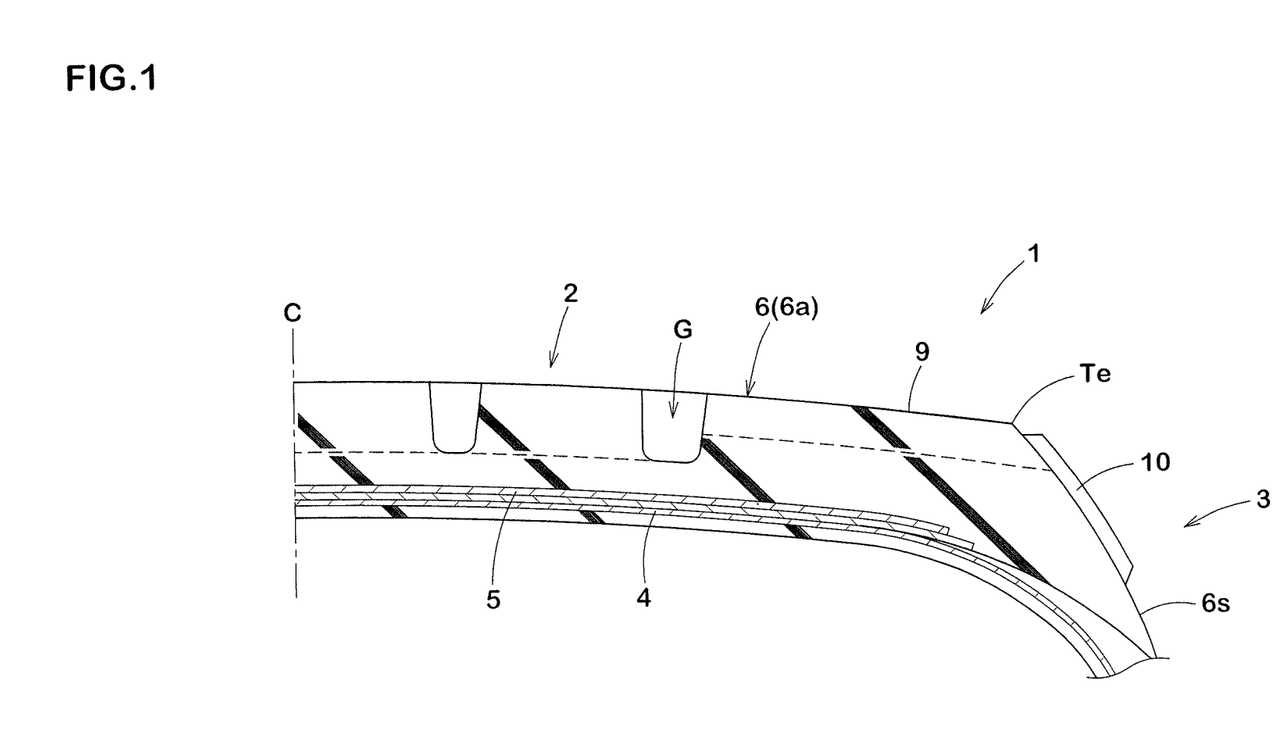
FIG. 1 is a partial cross-sectional view of a pneumatic tyre according to an embodiment of the present disclosure.

FIG. 1 is a partial cross-sectional view of a pneumatic tyre (hereinafter, simply referred to as "tyre") 1 under a normal state according to an embodiment of the present disclosure. Note that the cross-sectional view shows the right half portion of the tyre with respect to the tyre equatorial plane C. and which is a cross-section that includes the tyre axis (not illustrated). In this embodiment, as a preferred embodiment, a passenger car tyre is illustrated. The present disclosure may be embodied as other kinds of tyres, e.g., tyres for light trucks and heavy-duty vehicles.

As used herein, the normal state is such that the tyre 1 is mounted on a standard wheel rim (not illustrated) with a standard pressure but loaded with no tyre load. As used herein, dimensions of respective portions of the tyre 1 are values measured under the normal state unless otherwise noted.

The standard wheel rim is a wheel rim officially approved for each tyre by standards organizations on which the tyre 1 is based, wherein the standard wheel rim is the "standard rim" specified in JATMA, the "Design Rim" in TRA, and the "Measuring Rim" in ETRTO, for example.

The standard pressure is a standard pressure officially approved for each tyre by standards organizations on which the tyre 1 is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

The tyre 1 according to the embodiment includes a tread portion 2 and a pair of sidewall portions 3 each extending radially inwardly from a respective one of tread edges Te. The tyre 1, for example, is reinforced by a troidal carcass 4 and a belt layer 5 disposed on radially outwardly of the carcass 4 in the tread portion 2.

The tread portion 2, in the present embodiment, includes a shoulder land portion 6. The shoulder land portion 6 according to the embodiment is a portion including one of the tread edges Te, and is formed axially outwardly of a shoulder main groove G which is adjacent to the tread edge Te. In the present embodiment, two shoulder land portions 6 are provided so as to define the respective tread edges Te. The shoulder land portions 6, for example, each include a ground contact surface 6a, and an outer side surface 6s in the tyre axial direction. The outer side surface 6s is connected to the ground contact surface 6a and extends radially inwardly from the tread edge Te.

The "tread edges Te" are the axial outermost edges of the ground contact surface of the tyre 1 which occurs under the normal state of the tyre loaded with a standard tyre load when the camber angle of the tyre is zero.

As used herein, the standard tyre load is a tyre load officially approved or recommended for the tyre 1 by standards organizations, wherein the standard load is the "maximum load capacity" in JATMA, the maximum value given in the above-mentioned table in TRA or the like, and the "LOAD CAPACITY" in ETRTO.

Figure 2:
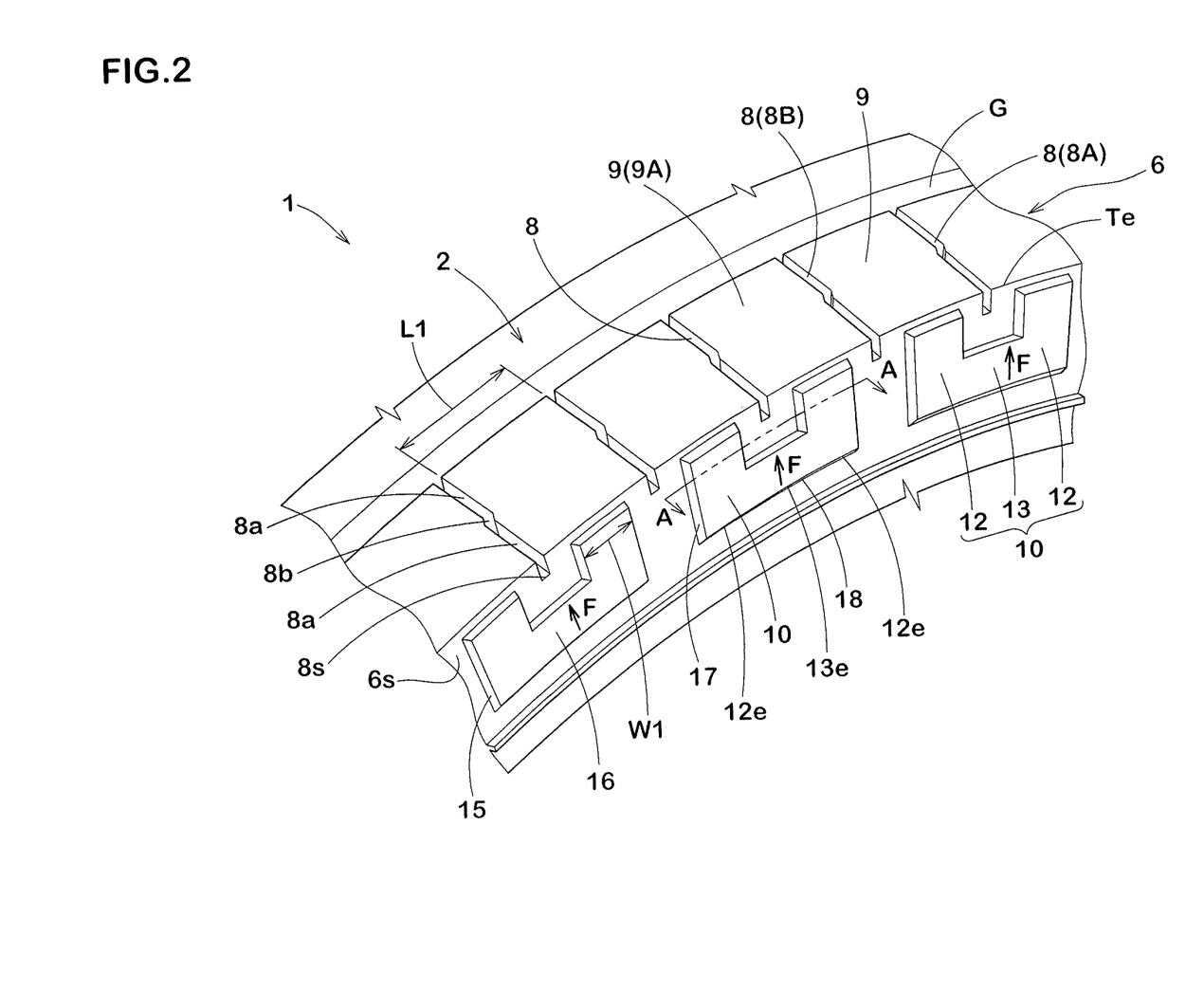
FIG. 2 is a perspective view of a shoulder land portion of FIG. 1.

FIG. 2 is a perspective view of the shoulder land portion 6. As illustrated in FIG. 2, one of the shoulder land portions 6 is provided with a plurality of shoulder lateral grooves 8 to define a plurality of shoulder block elements 9 therebetween, and at least one, preferably a plurality of protrusions 10 which protrude axially outwardly from the outer side surface 6s of the shoulder land portion 6. In the present embodiment, the respective shoulder land portions 6 are provided with the shoulder lateral grooves 8, the shoulder block elements 9 and at least one protrusion 10.

In the present embodiment, each protrusion 10 includes a plurality of first portions 12 extending in the tyre radial direction and a second portion 13 connecting inner portions of at least two first portions 12. When the tyre 1 travels on snow, a part of the tread portion 2 sinks into the snow such that the first portions 12 and the second portion 13 enter into the snow, and then compress the snow. In particular, the second portion 13 can apply the tyre load to the snow in the normal direction F as illustrated in FIG. 2, compressing the snow firmly. Then, the snow which was compressed firmly is sheared by the first portions 12 which extend in the tyre radial direction, and thus the tyre 1 can generate powerful traction.

The first portions 12 are provided on the respective shoulder block elements 9. Specifically, at least one of the first portions 12 is provided on a respective one of the shoulder block elements 9. In the present embodiment, a single first portion 12 is provided on a respective one of the shoulder block elements 9. In addition, in the present embodiment, a plurality of protrusions 10 is arranged over the entire circumferential direction of the shoulder land portion 6, resulting in improving traction on snow effectively.

The second portion 13 is located radially inwardly of one of the shoulder lateral grooves 8 and extends in the tyre circumferential direction. Thus, a snow pillar formed by one of the shoulder lateral grooves 8 can be integrated, in the tyre axial direction, to a snow block which is compressed by the protrusion 10 so as to form a large snow block, resulting in generating more powerful traction.

In the present embodiment, each protrusion 10, in a front view thereof, has a U-shaped manner that consists of two first portions 12 and a single second portion 13 connecting the two first portions 12. Such a protrusion 10, without depending a rotational direction of the tyre, can shear the snow block using either one of the first portions 12. Further, the protrusion 10 can help to improve snow driving performance while suppressing an excessive increase of mass of the tyre 1. Note that the protrusion 10 is not limited to the above aspect but can be modified as, in a front view thereof, a lateral E-shaped manner that includes three first portions 12 and two second portions 13 (not illustrated).

In the present embodiment, each protrusion 10 includes a wall surface 15 which protrudes from the outer side surface 6s, and an outward surface 16 which faces outwardly in the tyre axial direction and which is surrounded by the wall surface 15. The wall surface 15, in the present embodiment, includes radial surfaces 17 extending in the tyre radial direction and circumferential surfaces 18 extending in the tyre circumferential direction.

Figure 3:
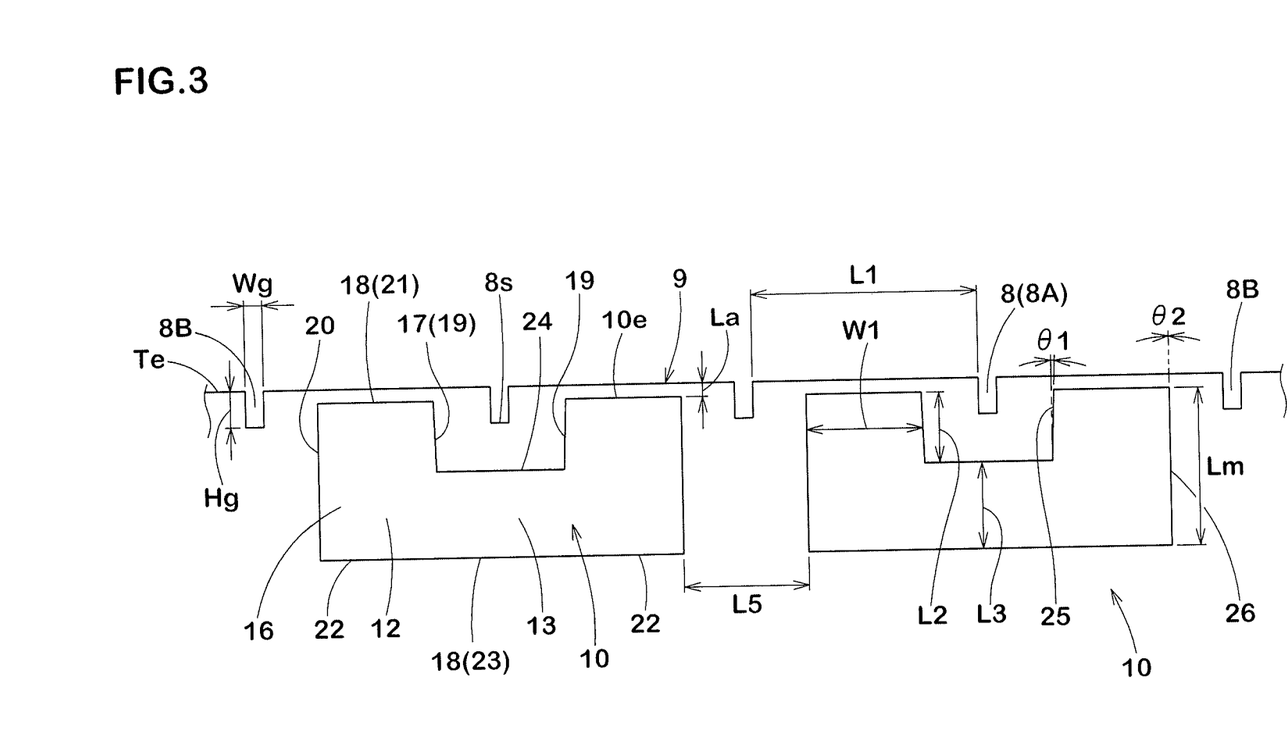
FIG. 3 is a front view of protrusions.

FIG. 3 illustrates a front view of some protrusions 10. FIG. 3, for the convenience sake, illustrates the tread edge Te which curves originally in an arc manner as a straight line. As illustrated in FIG. 3, the radial surfaces 17 of the first portions 12 include first radial surfaces 19 connected to the second portion 13, and a second radial surface 20 located outermost in the tyre circumferential direction of the protrusion 10. The circumferential surfaces 18 of the first portions 12 include first circumferential surfaces 21 on the tread edge Te side, and a second circumferential surface 22 located inwardly of the first circumferential surfaces 21. The circumferential surfaces 18 of the second portion 13 include a third circumferential surface 23 connecting the second circumferential surfaces 22 and 22, and a fourth circumferential surface 24 connecting the first radial surfaces 19 and 19.

It is preferable that the first circumferential surfaces 21, for example, extend along (e.g. parallel with) the tyre circumferential direction to shear snow blocks smoothly. Further, it is preferable that the fourth circumferential surfaces 24, for example, extend along (e.g. parallel with) the tyre circumferential direction to compress the snow effectively. In the present embodiment, the first and fourth circumferential surfaces 21 and 24 extend in the tyre circumferential direction along the tread edge Te.

In the present embodiment, the first portions 12 are configured such that widths W1 in the tyre circumferential direction of the first portions 12 are smaller than a circumferential length L1 of the respective shoulder block elements 9. Thus, this structure may make it possible to form a large snow block by the first portions 12 and the second portion 13, resulting in generating powerful traction. Further, an excessive increase of mass of the tyre 1 due to the protrusion 10 can be suppressed.

When the widths W1 of the first portions 12 are excessively small, stiffness of the first portions 12 is prone to be low, resulting in reducing snow traction. Thus, the widths W1 of the first portions 12 are preferably in a range of from 20% to 60% of the length L1 of the shoulder block elements 9.

As illustrated in FIG. 2, the first portions 12 and the second portion 13 respectively have inner edges 12e and 13e located radially innermost thereof. The inner edges 12e and 13e extend along (e.g. parallel with) the tyre circumferential direction. The inner edges 12e and 13e help to suppress an excessive increase of the mass of the tyre 1. The inner edges 12e are edges formed between the outer side surface 6s and the respective one of the second circumferential surfaces, and the inner edge 13e is an edge formed between the outer side surface 6s and the third circumferential surface 23. Each inner edge 12e and 13e, in the present embodiment, extends in parallel with the tread edge Te.

In the present embodiment, in each protrusion 10, the inner edges 12e of two first portions 12 and the inner edge 13e of the second portion are connected with each other so as to form a single circular arc. Thus, the above-mentioned effect can be exerted more effectively. Note that each of the inner edges 12e and 13e is not limited to such an aspect, but may be modified such that one is positioned different from another in the tyre radial direction (not illustrated), for example.

Figure 4:
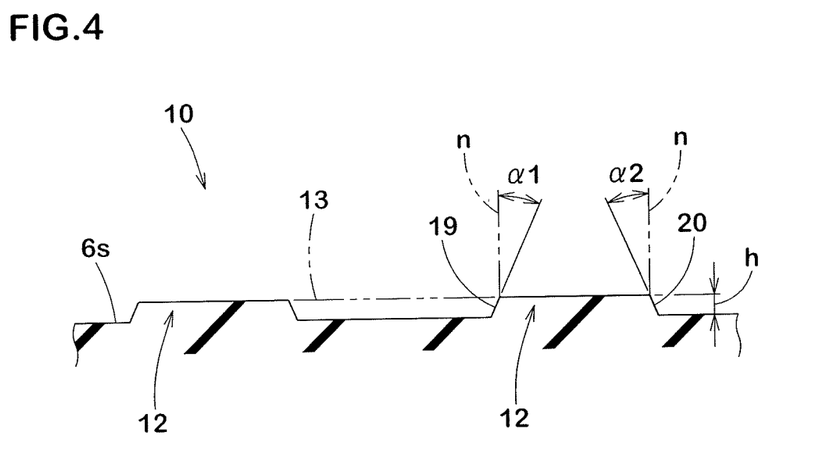
FIG. 4 is a cross-sectional view taken along line A-A of FIG. 2.

FIG. 4 illustrates a cross-sectional view taken along line A-A of FIG. 2. The line A-A extends along the tyre circumferential direction. As illustrated in FIG. 4, it is preferable that a protruding height h of the protrusion 10 is in a range of from 2.5 to 6.0 mm. When the protruding height h of the protrusion 10 is less than 2.5 mm, a snow block formed by the protrusion may be prone to be small which generates less traction. When the protruding height h exceeds 6.0 mm, the mass of the tyre 1 is prone to be large which may result in deteriorating driving performance.

It is preferable that the first radial surfaces 19 protrude in a tapered manner having an angle $\alpha 1$ equal to or less than 45 degrees with respect to a normal direction 11 of the outer side surface 6s. Thus, it enables to shear a snow block smoothly which is compressed by the first portions 12 and the second portion 13, generating powerful traction. Further, when traveling on snow, the snow enters into a gap between the second radial surfaces 20 and 20 of protrusions 10 which are arranged adjacently in the tyre circumferential direction, and then another snow block is also formed therebetween. In order to shear this snow block smoothly, it is preferable that the second radial surfaces 20 also protrude in a tapered manner having an angle $\alpha 2$ equal to or less than 45 degrees with respect to a normal direction n of the outer side surface 6s.

As illustrated in FIG. 3, in each protrusion 10, the first portions 12 include radially extending inner edges 25 which are located inwardly in a circumferential length direction of the protrusion 10 and between which one of the shoulder lateral grooves 8 is located. The inner edges 25 are edges formed between the respective outer side surfaces 6s and the first radial surfaces 19. Preferably, the inner edges 25 have an angle $\theta 1$ equal to or less than 10 degrees with respect to the tyre radial direction. When the angle $\theta 1$ of inner edges 25 exceeds 10 degrees, less force is generated by shearing a snow block which is compressed by the first portions 12 and the second portion 13, resulting in deteriorating traction.

In each protrusion 10, the first portions 12 further include radially extending outer edges 26 which are located outwardly in the circumferential length direction of the protrusion 10. The outer edges 26 are edges formed between the outer side surface 6s and the respective second radial surfaces 20. In the same viewpoints as the inner edges 25, the outer edges 26 have an angle $\theta 2$ equal to or less than 10 degrees with respect to the tyre radial direction.

It is preferable that a radial length Lm of the protrusion 10 is in a range of from 28% to 35% of the tyre section height (not illustrated). As to the "tyre section height", a calculated value which is a product of the section width by the aspect ratio on the indication of tyre size is used. Further, it is preferable that the lengths Lm of the respective protrusions 6 are preferably same as with one another on both shoulder land portions 6. This may help to suppress drift phenomenon since load applying to the protrusions 10 on both sides of the shoulder land portions 6 may be balanced with one another.

It is preferable that a radial length L2 of the first radial surfaces 19 is equal to or more than 0.5 times a radial length L3 of the second portion 13, more preferably equal to or more than 1.5 times, yet preferably 2.0 times. Further, it is preferable that the radial length L2 of the first radial surfaces 19 is equal to or less than 5.0 times the radial length L3 of the second portion 13, more preferably equal to or less than 4.5 times, yet preferably equal to or less than 4.0 times. Thus, the first portions 12 and the second portion 13, when traveling on snow, can compress the snow effectively to form a snow block, and then the first portions 12 can shear the snow block.

When a circumferential length (the minimum length) L5 between the adjacent protrusions 10 and 10 is small, a snow block to be formed between the adjacent protrusions 10 and 10 is prone to be small, and which may not generate large traction, for example. When the length L5 is large, the widths W1 of the first portions 12 become small and which may generate less shearing force to the snow block, for example. Thus, the length L5 is preferably equal to or more than 70% of the widths W1 of the first portions 12, more preferably equal to or more than 80%, but preferably equal to or less than 130%, more preferably equal to or less than 120%.

The protrusions 10 are formed on a location which is away radially inwardly from the tread edge Te. Thus, when traveling on an asphalt road condition, the protrusions 10 do not come into contact with the road, resulting in suppressing wearing the protrusion 10 out, for example. It is preferable that a radial distance La between the tread edge Te and a respective one of the outermost edges 10e (the first circumferential surfaces 21) of the protrusions 10 is equal to or less than 5 mm, for example. Note that the protrusions 10 are not limited to such an aspect, but can be formed such that the protrusions 10 extend radially inwardly from the tread edge Te, for example.

In the present embodiment, the shoulder lateral grooves 8 extend axially inwardly from the tread edge Te. The shoulder lateral grooves 8 in accordance with the present embodiment include at least one first shoulder lateral groove 8A inside which the second portion 13, in the tyre radial direction, is positioned, and at least one second shoulder lateral groove 8B inside which no second portion 13, in the tyre radial direction, is positioned.

In the present embodiment, the first shoulder lateral groove 8A and the second shoulder lateral groove 8B are arranged alternately in the tyre circumferential direction.

As illustrated in FIG. 2, the shoulder lateral grooves 8 are connected to the shoulder main groove G to improve traction on snow. In the present embodiment, the shoulder block elements 9 are configured as shoulder blocks 9A. Alternatively, the shoulder lateral grooves 8, for example, may terminate within the shoulder land portion 6 without reaching the shoulder main groove G.

Each shoulder lateral groove 8 according to the present embodiment includes a pair of first lateral groove portions 8a arranged on axially both sides of the shoulder lateral groove 8, and a second lateral groove portion 8b located between the pair of first lateral groove portions 8a and inclined at an angle greater than that of the pair of first lateral groove portions 8a. Such a shoulder lateral groove 8, for example, may improve noise performance since the groove walls of second lateral groove portion 8b cancel noise transmitted from the shoulder main groove G. Alternatively, the shoulder lateral grooves 8, for example, may extend in a single straight manner.

As illustrated in FIG. 3, the shoulder lateral grooves 8, in the present embodiment, have groove bottoms 8s which are located radially inwardly of the first circumferential surfaces 21 of the protrusions 10. Thus, shearing force generated by the first portions 12 applies to not only a snow block compressed by the first portions 12 and the second portion 13, but also a snow pillar compressed by the shoulder lateral groove 8, resulting in shearing these snow blocks effectively.

Although it is not limited, the shoulder lateral grooves 8 preferably have groove widths Wg of from 4.5 to 9.0 mm and groove depths Hg of from 7.5 to 9.5 mm.

Figure 5:
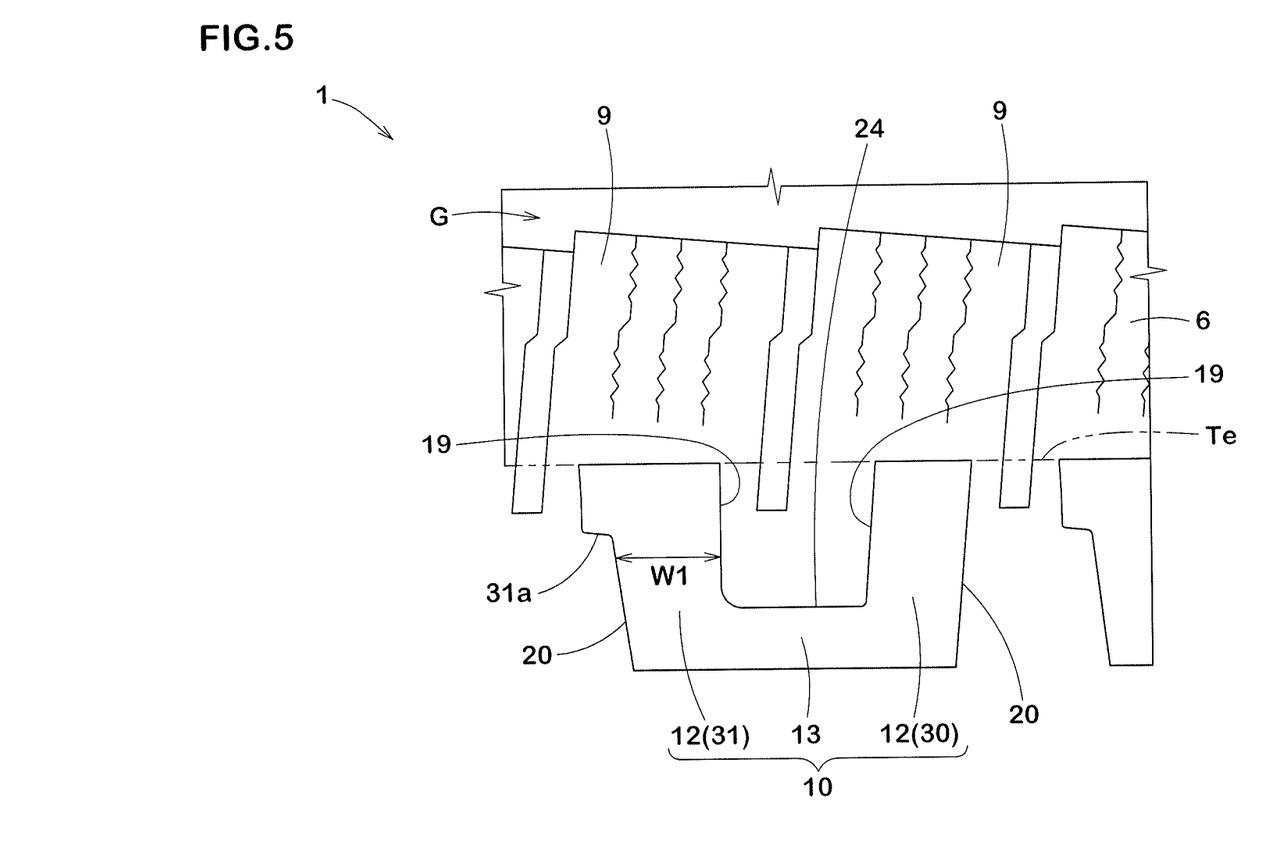
FIG. 5 is a development view of the shoulder land portion according to another embodiment.

FIG. 5 illustrates a development view of the shoulder land portion 6 in accordance with another embodiment of the disclosure. Note that same elements are denoted using the same reference numerals as the above-mentioned tyre 1 and description thereof is not repeated. In the embodiment as illustrated in FIG. 5, the protrusion 10 includes two first portions 12 which include a constant-width first portion 30 extending in the tyre radial direction with a constant circumferential width, and a non-constant-width first portion 31 extending in the tyre radial direction while varying its circumferential width. The constant-width first portion 30 forms one of the first portions 12 arranged on one side (right side in FIG. 5) of the protrusion 10 in the tyre circumferential direction and the non-constant-width first portion 31 forms the other one of the first portions 12 arranged on the other side (left side in FIG. 5) in the tyre circumferential direction. Note that an arrangement of the constant-width first portion 30 and the non-constant-width first portion 31 is not limited to the above aspect.

The constant-width first portion 30, in the present embodiment, is inclined in a direction with respect to the tyre radial direction so as to be away from the non-constant-width first portion 31 toward radially outwardly. Such a constant-width first portion 30 helps to discharge easily the snow compressed by the first portions 12 and the second portion 13 toward the ground. Further, the first radial surfaces 19 and the second radial surface 20 of the constant-width first portion 30 extend in a straight shape.

In the present embodiment, the circumferential width W1 of the non-constant-width first portion 31 increases radially outwardly. Since such a non-constant-width first portion 31 has stiffness which increases nearer to the ground, a snow block compressed by the first portions 12 and the second portion 13 can effectively sheared, leading to powerful shearing force. The first radial surface 19 of the non-constant-width first portion 31, for example, extends in the tyre radial direction in a straight manner. Further, the second radial surface 20 of the non-constant-width first portion 31, for example, extends toward radially outwardly in a direction so as to be away from the constant-width first portion 30 in a crank shaped manner. In the present embodiment, the second radial surface 20 of the non-constant-width first portion 31 has a crank-bent portion 31a which is located radially outwardly of the fourth circumferential surface 24 of the second portion 13.

While the particularly preferable embodiments in accordance with the present disclosure have been described in detail, the present disclosure is not limited to the illustrated embodiments, but can be modified and carried out in various aspects within the scope of the disclosure.

Example

Tyres having a basic structure shown in FIG. 1 and the shoulder land portion shown in FIG. 2 were prototyped based on the detail shown in Table 1, and then on-snow performance and the mass of these tyres were evaluated. In Table 1, the reference "A" represents an aspect whose shoulder lateral grooves are provided at the same locations as the first portions in the tyre circumferential direction and no second portion is provided, and the reference "B" represents the aspect shown in FIG. 2. Further, in these test tyres, except for the specification listed in Table 1, the shapes of tread portion and protrusions are same as with each other. The common specification of these test tyres are as follows:

tyre size: 275/55R20:
rim size: 20×9.0J; and
inner pressure: 250 kPa.

The test methods are as follows.
On-Snow Performance Test:

In each example, four test tyres were mounted to a four-wheel-drive vehicle having a displacement of 3600 cc. Then, a test driver drove the vehicle on a test course covered with snow, and then evaluated driving performance with respect to traction at speed of 40 to 70 km/h by the driver's feeling. The test results are shown in Table 1 using a score system where Ref. 1 is set to 100. The larger value indicates better the on-snow performance with powerful traction.
Tyre Mass Test:

As the tyre mass evaluation, each tyre mass was measured. The test results are shown in Table 1 using a score system where Ref. 1 is set to 100. The smaller value indicates lighter mass.

Table 1 shows the test results.

TABLE 1

|  | Ref. 1 | Ex. 1 | Ex. 2 | Ex. 3 | Ex. 4 | Ex. 5 | Ex. 6 | Ex. 7 |
| --- | --- | --- | --- | --- | --- | --- | --- | --- |
| Layout of protrusions | A | B | B | B | B | B | B | B |
| W1/L1 (%) | 40 | 40 | 10 | 70 | 40 | 40 | 40 | 40 |
| h (mm) | 3.5 | 3.5 | 3.5 | 3.5 | 1.5 | 7.0 | 3.5 | 3.5 |
| α1 (deg.) | 30 | 30 | 30 | 30 | 30 | 30 | 60 | 30 |
| θ1 (deg.) | 0 | 0 | 0 | 0 | 0 | 0 | 0 | 20 |
| On-snow performance [score] | 100 | 120 | 112 | 114 | 114 | 122 | 114 | 116 |
| Tyre mass [index] | 100 | 100 | 96 | 104 | 98 | 104 | 98 | 100 |

From the test results, it is confirmed that the example tyres improve on-snow performance while suppressing an increase of tyre mass compared with the comparative example tyre.

What is claimed is:

1. A pneumatic tyre comprising:
a tread portion comprising a shoulder land portion having a tread edge, the shoulder land portion being provided with shoulder lateral grooves extending inwardly in a tyre axial direction from the tread edge so as to define shoulder block elements therebetween, and plural protrusions protruding from an outer surface in the tyre axial direction of the respective shoulder land portion, wherein the plural protrusions are circumferentially spaced and
disconnected from each other and comprise:
first portions provided on the respective shoulder block
elements and extending in a tyre radial direction, and
a second portion located inwardly in the tyre radial
direction of one of the shoulder lateral grooves,
extends in a tyre circumferential direction to connect
radially inner ends of at least two first portions, and
widths in the tyre circumferential direction of the first
portions are greater than groove widths of the shoulder
lateral grooves at the tread edge,
the first portions comprise inner edges extending in the
tyre radial direction located inwardly in a circumferential direction of the plural protrusions, the inner
edges have a radial length in a range of from 0.5 to 5.0
times a radial length of the second portion, each first
portion comprises circumferentially spaced first and
second radial surfaces each extending in the tyre radial
direction,
in a front view of the outer surface of the shoulder block
element, the first and second radial surfaces are offset
in the tyre circumferential direction from the shoulder
lateral grooves adjacent to the shoulder block element,
and
the shoulder lateral grooves comprise a first shoulder
lateral groove inside which the second portion, in the
tyre radial direction, is positioned, and a second shoulder lateral groove inside which no second portion, in
the tyre radial direction, is positioned.

2. The pneumatic tyre according to claim 1, wherein
each protrusion, in a front view thereof, has a U-shaped
manner that consists of two first portions and a single
second portion connecting said two first portions.

3. The pneumatic tyre according to claim 1, wherein
the first shoulder lateral groove and the second shoulder
lateral groove are arranged alternately in the tyre circumferential direction.

4. The pneumatic tyre according to claim 1, wherein
widths in the tyre circumferential direction of the first
portions are smaller than lengths in the tyre circumferential direction of the respective shoulder block elements.

5. The pneumatic tyre according to claim 4, wherein
the widths in the tyre circumferential direction of the first
portions are in a range of from 20% to 60% of the
lengths in the tyre circumferential direction of the
respective shoulder block elements.

6. The pneumatic tyre according to claim 1, wherein
a protruding height of each protrusion is in a range of
from 2.5 to 6.0 mm.

7. The pneumatic tyre according to claim 1, wherein
in a cross-sectional view in parallel with the tyre circumferential direction, the first portions each protrude in a
tapered manner such that side surfaces thereof are
inclined at an angle of equal to or less than 45 degrees
with respect to a normal line of the outer surface of the
shoulder land portion.

8. The pneumatic tyre according to claim 1, wherein
the first portions comprise inner edges extending in the
tyre radial direction located inwardly in a circumferential direction of each protrusion, and
the inner edges have an angle of equal to or less than 10
degrees with respect to the tyre radial direction.

9. The pneumatic tyre according to claim 1, wherein
the first portions comprise
a constant-width first portion extending in the tyre radial
direction with a constant circumferential width, and
a non-constant-width first portion extending in the tyre
radial direction while varying its circumferential width.

10. The pneumatic tyre according to claim 1, wherein
the at least two first portions and the second portion have
radially inner edges located innermost in the tyre radial
direction thereof, and
the inner edges extend along the tyre circumferential
direction.

11. The pneumatic tyre according to claim 10, wherein
the inner edges of the at least two first portions and the
second portion are connected with each other so as to
form a single circular arc.

12. The pneumatic tyre according to claim 1, wherein
a radial length of each protrusion is in a range of from
28% to 35% of a tyre section height.

13. The pneumatic tyre according to claim 1, wherein
the shoulder lateral grooves have groove bottoms that are
located radially inwardly of radially outermost edges of
the first portions.

14. The pneumatic tyre according to claim 2, wherein
widths in the tyre circumferential direction of the first
portions are smaller than lengths in the tyre circumferential direction of the respective shoulder block elements.

15. A pneumatic tyre comprising:
a tread portion comprising a shoulder land portion having
a tread edge, the shoulder land portion being provided
with shoulder lateral grooves extending inwardly in a
tyre axial direction from the tread edge so as to define
shoulder block elements therebetween, and plural protrusions protruding from an outer surface in the tyre
axial direction of the respective shoulder land portion,
wherein
the plural protrusions are circumferentially spaced and
disconnected from each other and comprise:
first portions provided on the respective shoulder block
elements and extending in a tyre radial direction, and
a second portion located inwardly in the tyre radial
direction of one of the shoulder lateral grooves,
extends in a tyre circumferential direction to connect
radially inner ends of at least two first portions,
each first portion comprises circumferentially spaced first
and second radial surfaces each extending in the tyre
radial direction, and in a front view of the outer surface
of each shoulder land portion, the first and second
radial surfaces are offset in the tyre circumferential
direction from the shoulder lateral grooves adjacent to
the shoulder land portion, and
the shoulder lateral grooves comprise a first shoulder
lateral groove inside which the second portion, in the
tyre radial direction, is positioned, and a second shoulder lateral groove inside which no second portion, in
the tyre radial direction, is positioned.

16. A pneumatic tyre comprising:
a tread portion comprising a shoulder land portion having
a tread edge, the shoulder land portion being provided
with shoulder lateral grooves extending inwardly in a
tyre axial direction from the tread edge so as to define
shoulder block elements therebetween, and plural protrusions protruding from an outer surface in the tyre
axial direction of the respective shoulder land portion,
wherein
the plural protrusions are circumferentially spaced and
disconnected from each other and comprise:
first portions provided on the respective shoulder block
elements and extending in a tyre radial direction, and a second portion located inwardly in the tyre radial direction of one of the shoulder lateral grooves, extends in a tyre circumferential direction to connect radially inner ends of at least two first portions, each first portion comprises a first circumferential surface located outermost in the tyre radial direction, and in a front view of the outer surface of each shoulder land portion, the first circumferential surface is offset radially inwardly from the tread edge, and the shoulder lateral grooves comprise a first shoulder lateral groove inside which the second portion, in the tyre radial direction, is positioned, and a second shoulder lateral groove inside which no second portion, in the tyre radial direction, is positioned.

* * * * *